(12) United States Patent
Fish et al.

(10) Patent No.: US 9,142,110 B2
(45) Date of Patent: **\*Sep. 22, 2015**

(54) PANIC DEVICE WITH LOCAL ALARM AND DISTAL SIGNALING CAPABILITY

(75) Inventors: Robert D. Fish, Tustin, CA (US); Robert Eisenman, Newport Beach, CA (US)

(73) Assignee: Global Life-Line, Inc., Newport Beach, CA (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/773,161

(22) Filed: May 4, 2010

(65) Prior Publication Data

US 2010/0216423 A1 Aug. 26, 2010

Related U.S. Application Data

(60) Division of application No. 12/173,630, filed on Jul. 15, 2008, which is a continuation-in-part of application No. 10/817,000, filed on Apr. 2, 2004, now Pat. No. 7,315,242, which is a continuation-in-part of application No. 09/753,163, filed on Jan. 2, 2001, now Pat. No. 7,142,096.

(60) Provisional application No. 60/950,571, filed on Jul. 18, 2007.

(51) Int. Cl.

| B60R 25/10 | (2013.01) |
| G08B 13/22 | (2006.01) |
| B60R 25/33 | (2013.01) |
| G07C 9/00 | (2006.01) |
| G08B 21/02 | (2006.01) |
| G08B 25/01 | (2006.01) |
| B60R 25/22 | (2013.01) |
| H04W 4/00 | (2009.01) |

(Continued)

(52) U.S. Cl.
CPC ............ *G08B 13/22* (2013.01); *B60R 25/1003* (2013.01); *B60R 25/22* (2013.01); *B60R 25/33* (2013.01); *G07C 9/00944* (2013.01); *G08B 21/028* (2013.01); *G08B 21/0288* (2013.01); *G08B 25/014* (2013.01); *G08B 25/016* (2013.01); *B60R 2325/205* (2013.01); *G08B 1/00* (2013.01); *H04L 1/00* (2013.01); *H04W 4/00* (2013.01)

(58) Field of Classification Search
CPC .................................. H04W 4/00; G08B 1/00
USPC ................... 340/426.1, 825.31, 988; 364/198
See application file for complete search history.

(56) References Cited

U.S. PATENT DOCUMENTS

| 5,382,948 A | 1/1995 | Richmond | |
| 5,515,043 A * | 5/1996 | Berard et al. | ................. 340/988 |

(Continued)

OTHER PUBLICATIONS

Global Positioning System Overview, Peter H. Dana, Department of Geography, University of Texas.

*Primary Examiner* — Shirley Lu
(74) *Attorney, Agent, or Firm* — Fish & Tsang LLP

(57) ABSTRACT

A panic device operable in conjunction with a local device is configured to unlock a locking mechanism. The panic device can take the form of an electronic key fob, a key shaft, or a key holder. A first trigger on the panic device triggers a local alarm that is on-board or off-board the panic device. A second trigger on the panic device can activate an alarm circuitry that utilizes a local device to provide position information to a distant dispatch station. The local device uses a GPS-aware circuitry or other non-GPS means such as triangulation to determine the position information. The position information can then be sent to the distant dispatch station with or without the aid of the local device.

13 Claims, 13 Drawing Sheets

(51) Int. Cl.
*H04L 1/00* (2006.01)
*G08B 1/00* (2006.01)

(56) References Cited

U.S. PATENT DOCUMENTS

| | | | |
|---|---|---|---|
| 5,515,419 A | 5/1996 | Sheffer | |
| 5,555,286 A | 9/1996 | Tendler | |
| 5,629,761 A * | 5/1997 | Theodoulou et al. | 399/307 |
| 5,630,206 A | 5/1997 | Urban et al. | |
| 5,742,233 A | 4/1998 | Hoffman et al. | |
| 5,808,564 A | 9/1998 | Simms et al. | |
| 5,838,237 A | 11/1998 | Revell et al. | |
| 5,864,297 A * | 1/1999 | Sollestre et al. | 340/5.23 |
| 5,884,199 A | 3/1999 | Maki | |
| 5,899,855 A | 5/1999 | Brown | |
| 5,913,827 A | 6/1999 | Gorman | |
| 5,929,761 A * | 7/1999 | Van der Laan et al. | 340/573.1 |
| 5,933,080 A | 8/1999 | Nojima | |
| 5,959,529 A | 9/1999 | Kail, IV | |
| 5,963,130 A | 10/1999 | Schlager et al. | |
| 5,973,412 A | 10/1999 | Nantz et al. | |
| 6,028,514 A | 2/2000 | Lemelson et al. | |
| 6,084,517 A | 7/2000 | Rabanne et al. | |
| 6,094,140 A | 7/2000 | Parente | |
| 6,166,627 A | 12/2000 | Reeley | |
| 6,292,110 B1 | 9/2001 | Budnovitch | |
| 6,392,592 B1 | 5/2002 | Johnson et al. | |
| 6,437,692 B1 | 8/2002 | Petite et al. | |
| 6,539,301 B1 * | 3/2003 | Shirk et al. | 701/200 |
| 6,738,712 B1 | 5/2004 | Hildebrant | |
| 6,946,977 B2 | 9/2005 | Chen et al. | |
| 7,142,096 B2 | 11/2006 | Eisenman | |
| 2001/0003443 A1 * | 6/2001 | Velazquez et al. | 342/367 |
| 2001/0028196 A1 | 10/2001 | Burr et al. | |
| 2001/0029410 A1 * | 10/2001 | Obradovich | 701/1 |
| 2001/0053947 A1 * | 12/2001 | Lenz et al. | 700/117 |
| 2003/0231550 A1 * | 12/2003 | Macfarlane | 367/198 |
| 2004/0180668 A1 * | 9/2004 | Owens et al. | 455/456.1 |

* cited by examiner

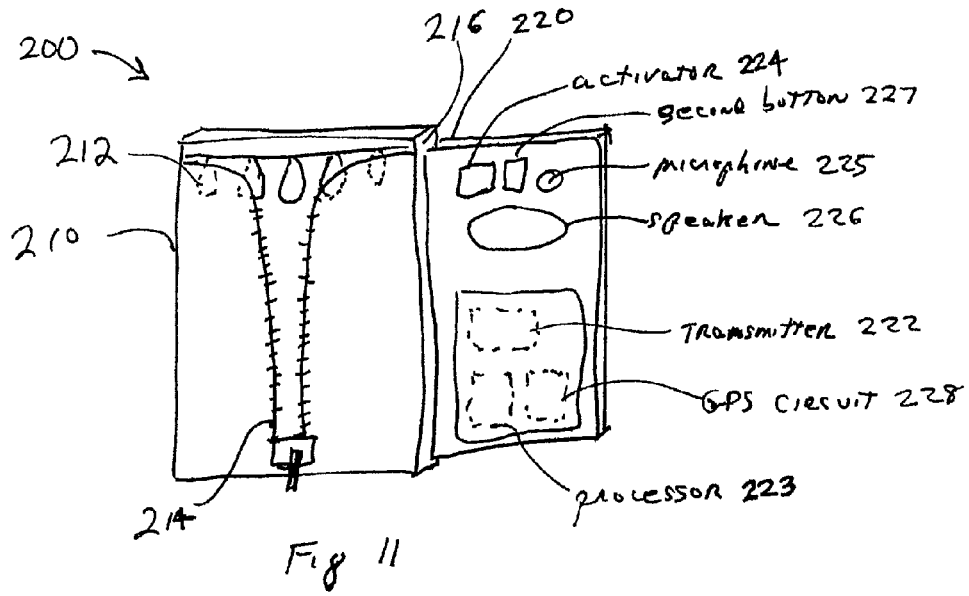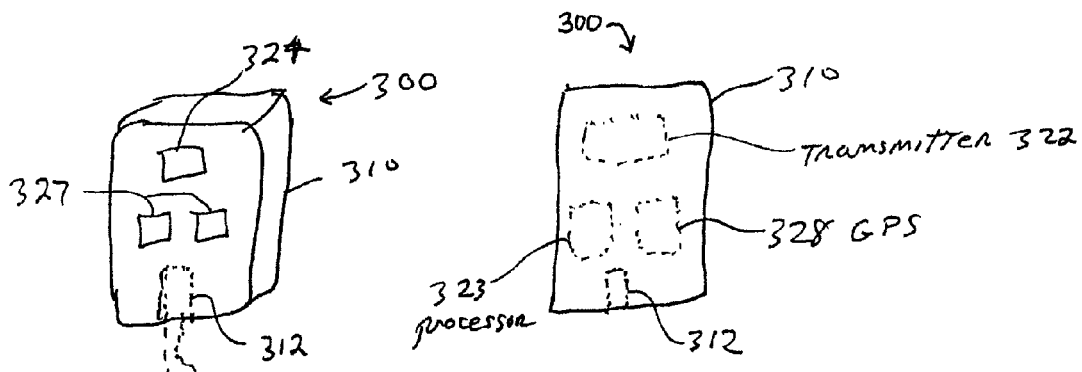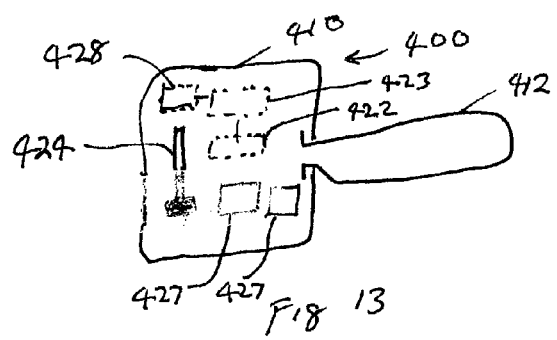

PANIC DEVICE WITH LOCAL ALARM AND DISTAL SIGNALING CAPABILITY

This application is a divisional of U.S. application Ser. No. 12/173,630, filed Jul. 15, 2008, which claims priority to provisional application No. 60/950,571 and is a CIP of U.S. application Ser. No. 10/817,000, filed Apr. 2, 2004, now U.S. Pat. No. 7,315,242 which is a CIP of U.S. application Ser. No. 09/753,163, filed Jan. 2, 2001, now U.S. Pat. No. 7,142,096 and also claims priority to provisional application 60/950,571, filed Jul. 18, 2007, each of which are incorporated herein their entirety.

FIELD OF THE INVENTION

The present invention generally relates to locator systems.

BACKGROUND OF THE INVENTION

Numerous types of combination vehicle alarm and locator systems are known in the field. Examples are described in U.S. Pat. Nos. 5,742,233, 5,838,237, 5,884,199, 5,899,855, 5,913,827, 5,929,761, 5,959,529, 5,963,130, 6,028,514 and 6,094,140.

These cited prior art documents, as well as other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

U.S. Pat. No. 5,742,233 to Hoffman et al. (Apr. 21, 1998) teaches a signaling system that comprises a portable signaling unit, a remote alarm switch device, a central dispatch station, a wireless communication system such as a cellular or telephone system, etc., and a GPS or like system. The portable signaling unit and the remote alarm switch can be adapted to be worn at different locations on the person's body. The remote alarm switch can be concealed in the form of a wristband or in the form of any other object such as a broach, pendant, or key chain. When the person in distress activates the remote alarm switch or when the remote alarm switch is removed from the individual by a forceful or unauthorized action or when the signaling unit is removed from the proximity of the remote alarm switch, the portable signaling unit sends a data transmission which includes its location to the central dispatch station. The portable signaling unit also has manual alarm trigger capabilities so it can be used without the remote alarm switch unit. The central dispatch station receives the data transmission and accurately displays the user identification, stored personal information, and nature of the alarm. In addition, the location of the portable signaling unit is superimposed on a digitized map at a position corresponding to the location of the person wearing the portable signaling unit. The portable signaling unit can be remotely activated from a central dispatch station to determine and monitor the location of the portable signaling unit.

U.S. Pat. No. 5,838,237 to Revell et al., (Nov. 17, 1998) teaches a self-contained personal alarm device capable of signaling its location to a remote site such as a security station. The personal alarm device includes a housing enclosing a controller, an antenna, a cellular transmitter and a cellular receiver. The controller is coupled to the transmitter and receiver, which are in turn coupled to the antenna. The controller controls the transmitter and the receiver to receive position location signals such as Global Positioning System (GPS) signals, establish a cellular connection with a remote site, and transmit device location data to the remote site on the cellular connection, wherein the device location data indicates the location of the device. The cellular connection is established via a cellular telecommunication network that includes an array of cell base stations. The GPS signals are transmitted to the device over the cellular network by providing each cell base station with a Differential Global Positioning System (DGPS) receiver. Using the DGPS receivers, GPS signals are repeated over the cellular network.

U.S. Pat. No. 5,884,199 to Maki (Mar. 16, 1999) teaches a portable wireless receiver that has a position locating function through reception of GPS satellite radio waves. The portable wireless receiver has a speaker/microphone unit including a GPS antenna, a speaker, and a microphone built into the unit.

U.S. Pat. No. 5,899,855 to Brown (May 4, 1999) teaches insertion of an internal housing frame into a pre-existing housing box provided for telephone line access. The frame accommodates a removable cover plate with custom cut holes designed for both lock (cam lock) and plunger switch (i.e. tamper switch). The original exterior cover plate is placed over the front of the inserted device so as to hold the plunger switch down in position, ready for alarm activation. The installation of the above device prevents or deters a would-be burglar from cutting or damaging telephone lines after removal of the exterior cover plate.

U.S. Pat. No. 5,913,827 to Gorman (Jun. 22, 1999) teaches a personal monitor for monitoring a biomedical condition, such as a heart rate. A sensor provides a signal related to the biomedical condition and the signal is encoded for repeated wireless transmission to a receiver. An encoded identification signal is also repeatedly sent to the receiver to identify the transmitter to the receiver, to thereby prevent the adverse effects of interference that occur if signals other than those from the transmitter are received. The monitor detects deviations (errors) from an expected pattern and recovers from these deviations (error correction) to display an accurate value of the biomedical condition. If too many errors are present due to interference, faulty transmission and/or reception, etc., the frequency over which wireless transmission occurs can be changed. In one embodiment, the value of the biomedical condition is wirelessly sent to the receiver. In another embodiment, the value of the biomedical condition is determined in the receiver based on the encoded signal that is received. The receiver rejects all signals that are not from the transmitter.

U.S. Pat. No. 5,929,761 to Van der Laan et al. (Jul. 27, 1999) teaches an alarm system comprising: a carrier unit; a base unit having an in-output for coupling to a communication network; an alarm monitoring station coupled to that network; wherein the carrier unit comprises a transmitter and an alarm switch coupled to an alarm input of the transmitter. By operating the alarm switch, the base unit is wirelessly activated by the carrier unit. Accordingly, the base unit makes connection with the communication network, and selects the access number of the alarm monitoring station. In accordance with Van der Laan's invention, the transmitter comprises a microphone input coupled to a microphone. Speech signals from the user are wirelessly transmitted by the transmitter to the base unit, which transmits these speech signals via the communication network to the alarm monitoring station.

U.S. Pat. No. 5,959,529 to Kail (Sep. 28, 1999) teaches an automated, real-time, reprogrammable monitoring and control system for portable, remote sensors and subjects including one or more portable monitoring units, each of the portable monitoring units having a sensor, a location-determining device, and a sensor interface unit. Each sensor interface unit is separately configured to monitor its sensor and to transmit that sensor's data, via a digital wireless communications network, to a central monitoring device. The portable unit is carried or worn by a person or animal, or affixed to an inanimate subject.

U.S. Pat. No. 5,963,130 to Schlager et al. (Oct. 5, 1999) teaches a self-locating remote monitoring system including a supervising base station and one or more remote monitoring units. A remote unit includes a navigational receiver operating with an existing navigational system for providing a remote unit location and includes a transmitter for communicating the location to the base station for display. The remote unit includes one or more physiological/environmental sensors for monitoring at the remote location. In a specific embodiment a change in sensor status results in the status and the location being transmitted to the base station. The base station includes alarms and displays responsive to the change in status. One embodiment defines a man-over-board system, which combines water immersion and distance from the base station to trigger an alarm and begin location tracking. Another embodiment defines an invisible fence system which uses location and time to define boundaries for containment and exclusion. Another embodiment includes a weather surveillance radar receiver providing weather parameters within a weather region and defines a remote weather alarm system. The weather alarm system uses the weather receiver to monitor weather within a defined region and to provide the base station with location and weather parameters if the parameters fall outside defined limits.

U.S. Pat. No. 6,028,514 to Lemelson et al. (Feb. 22, 2000) teaches a comprehensive system and method for monitoring a geographic person location, periodically warning a person of emergency situations in the geographic location, and transmitting requests for assistance in emergency situations. The system comprises a warning unit that is carried by the person or that is located in mobile units or in buildings or houses. The warning unit includes a geographic satellite receiver, a receiver circuit that receives broadcast warning signals defining dangerous situations and geographic locations of the situations, a computer controller including a processor and a memory, an alarm indicator that indicates when the person is in danger, and a transmission circuit that generates and transmits signals requesting assistance and signals warning of the dangerous situations in a vicinity of the person carrying the portable warning unit, along with the current geographic location of the person. The system further comprises a command center. The command center includes a database computer having a database storage unit, a transmitter for broadcasting signals to the unit(s), a receiver for receiving signals, a transmitter for transmitting signals to emergency response units and centers, and other such communication devices. The system uses the unit(s) to monitor and communicate with the person using it. The unit(s) interface with the command center through signals indicative of a dangerous situation and a geographic situation location, transmitted from the command center to the unit(s). The geographic person location is compared with the geographic situation location indicated in the received signal from the command center. Expert system rules are used to determine the dangerous situation and a degree(s) of danger index for the person(s) near or at the geographic situation location.

U.S. Pat. No. 6,094,140 to Parente (Jul. 25, 2000) teaches a portable locator system for alerting a central station of an emergency. The portable alarm system includes a central unit for monitoring a desired area and a remote panic device for activating and signaling the central unit. The central unit includes a detector for detecting an emergency situation and generating a signal in response thereto, a processor for receiving the detection signal and generating an alarm signal in response thereto, a receiver for receiving an emergency signal and providing the emergency signal to the processor and an alarm for alerting the central station upon receipt of one of the alarm signal and emergency signal. The remote panic device includes a device for generating the emergency signal upon receipt of a user generated command and a transmitter for transmitting the emergency signal to the receiver of the central unit. The detection device is a motion detector for detecting motion in an area surrounding the central unit and the remote panic device includes an activation button for generating a signal for activating the motion detector. The remote control unit further includes a button for generating a medical emergency signal and a panic signal for transmission to the central unit. The transmitter includes at least one of a modem for connecting to and transmitting the alarm signal to the central station via telephone lines and a wireless transmitter for wirelessly transmitting the alarm signal to the central station.

Thus, there is still a need for a panic device that can be used in conjunction with a local device external to the panic device to send location information to a dispatch station.

SUMMARY OF THE INVENTION

The present invention provides apparatus and methods in which a panic device, operable in conjunction with a local device external to the panic device, can be used to unlock a locking mechanism.

In contemplated embodiments the panic device can utilize any suitable form factor, including for example, a proximity responder, such as a key fob having electronics operable to unlock the locking mechanism, a key shaft operable to unlock the locking mechanism, or a holder (e.g., a key case, key ring retainer, key chain, etc.) sized and dimensioned to receive a physical key. Contemplated keys can fit locks in all manner of locked spaces, including for example, transportation vehicles (generically referred to herein as cars or automobiles, but also including trucks, motorcycles, mobile homes and so forth), as well as non-vehicular applications, including for example houses and apartments.

Further embodiments contemplate a first trigger that triggers a local alarm. The local alarm can be on-board the panic device (for example using a speaker) or off-board the panic device (for example using a horn or speaker in a local motor vehicle). In a device with an on-board speaker, speaker can advantageously emit a loud noise to frighten an attacker and alert potential bystanders of the user's need for help.

In preferred embodiments a panic device comprises an alarm circuitry that provides position information to a distant dispatch station. The alarm circuitry utilizes a local device to either determine the position information or transmit a signal to the dispatch station. Thus, for example, the panic device could receive position information from a nearby local device such as a cell phone or PDA, or from a GPS in a local motor vehicle. In other contemplated embodiments the local device can both determine the position information and transmit a signal to the dispatch station. Use of a local device external to the panic device has the advantage that the circuitry used by the local device to determine position information and transmit a signal is not drawing power from the panic device.

A preferred method contemplates any suitable manner of determining the position information. For example, a panic device can be used in conjunction with a local device that has a GPS-aware circuitry to determine the position information. In other contemplated methods a panic device can be used in conjunction with a local device that does not have a GPS-aware circuitry to determine the position information. In such methods the position information could be determined by triangulation of cell phone signals emitted by the local device.

A preferred method also contemplates any suitable means for transmitting a signal to a dispatch station. The signal can be sent to the dispatch station directly from the panic device (such as through a cell phone facility housed in the device), or indirectly through a nearby telephony or WIFI communication device (such as a cell phone, PDA, computer, or even through a communication device of a transportation vehicle that emits the local alarm). Contemplated signals can contain any information relevant to the dispatch of aid to the user, including for example position information and identification information.

Still other contemplated embodiments include a second trigger that activates the alarm circuitry. The second trigger can comprise a button, a plurality of buttons, a slider, or any other suitable interface, including for example an audio interface that includes a microphone and recognizes a voice command.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWINGS

FIG. 11 is a plan view of a panic device having a transmitter, processor and activator disposed in an electronic card, which is shown as extending from a side pocket of a key holder.

FIG. 12A is a plan view of a panic device having a transmitter, processor and activator disposed in a key fob.

FIG. 12B is vertical cross-section of the key fob of FIG. 12A.

FIG. 13 is a plan view of a panic device having a transmitter, processor and activator disposed in a housing of a key ring.

DETAILED DESCRIPTION

Figure 1:
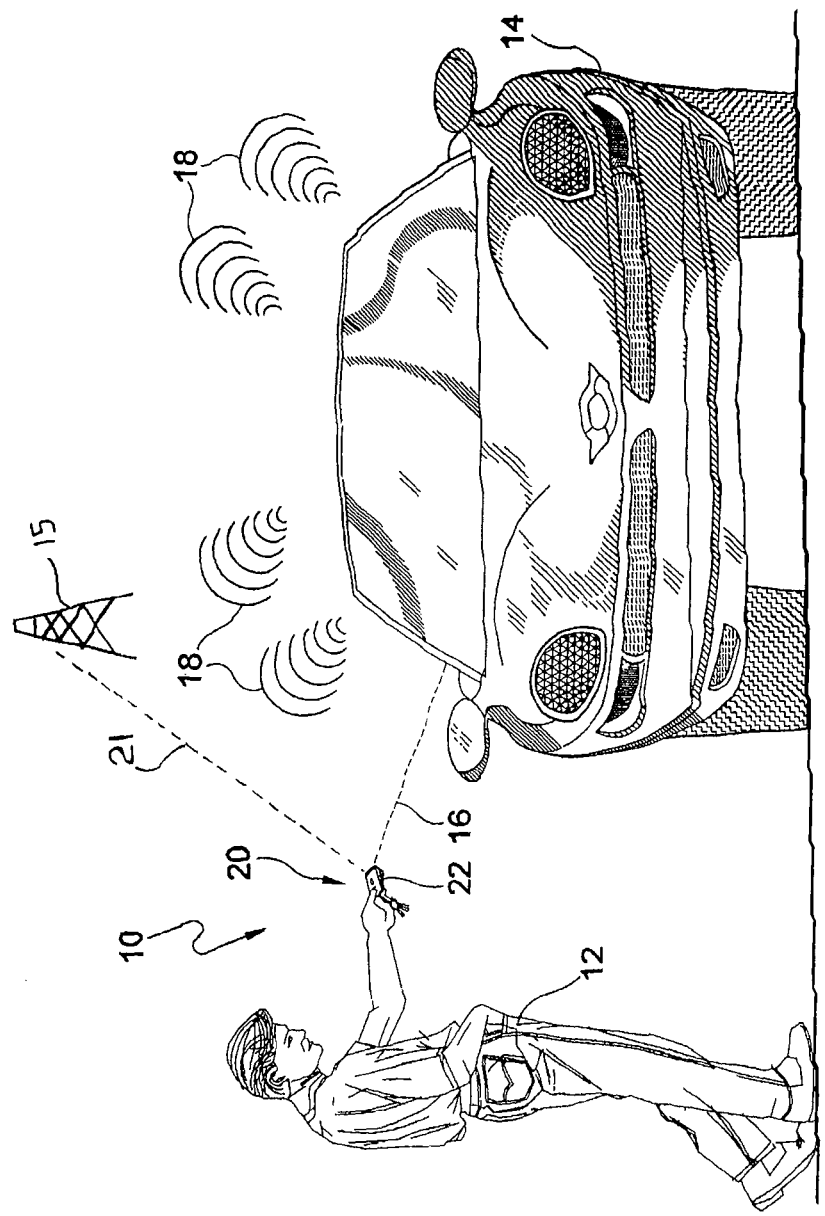
FIG. 1 is a perspective view of a person utilizing a vehicle alarm feature of a combination vehicle alarm and locator system.

In FIG. 1 a user 12 is standing outside a vehicle 14 with a panic device 20 of a combination vehicle alarm and locator system 10. Positioned on the panic device 20 is a first trigger 22 for activating the vehicle alarm function of the combination vehicle alarm and locator system 10. When the first trigger 22 is activated, the panic device 20 generates and transmits a signal 16 to the vehicle 14. The signal 16 is received by the alarm system of the vehicle 14 and acts to either activate or deactivate the alarm system. The vehicle alarm system preferably generates an audible signal when either the system is activated or an attempt is made to circumvent the system. The audible signal generated by the alarm system is represented by the arced lines labeled with the numeral 18.

Figure 2:
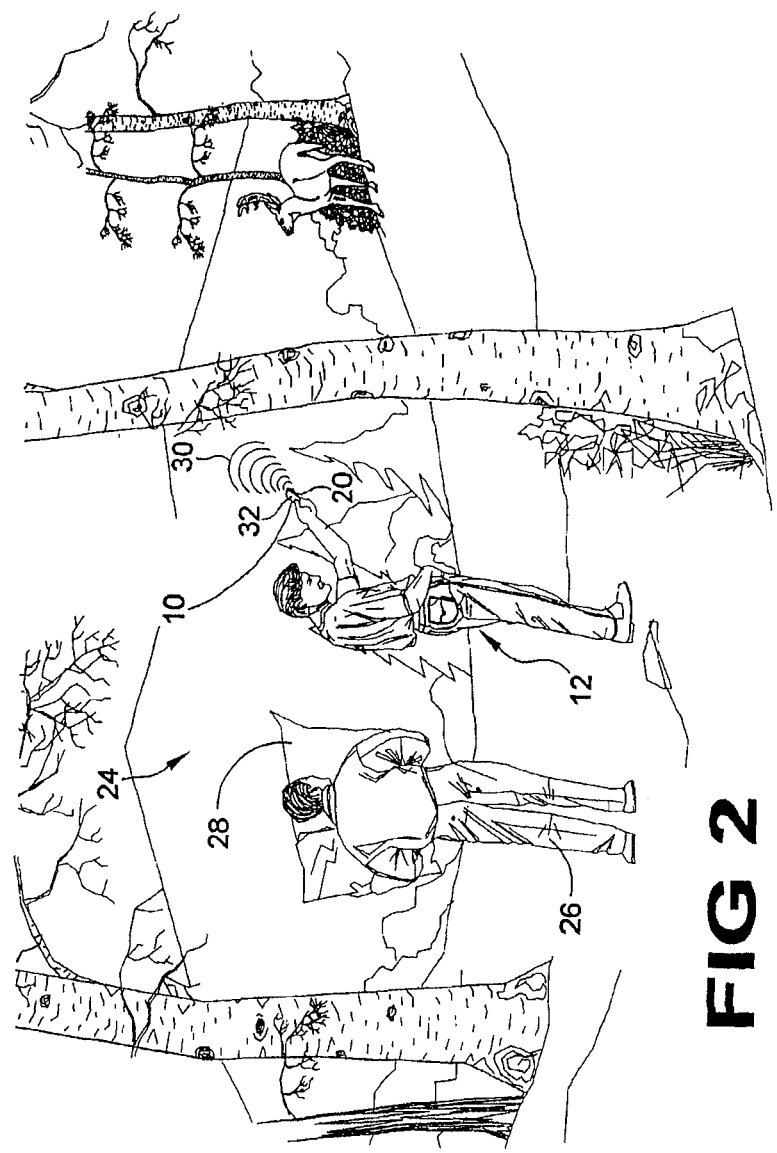
FIG. 2 is a perspective view of a person utilizing a locator feature of a combination vehicle alarm and locator system.

FIG. 2 illustrates the panic device 20 being used by a user 12 lost in a wooded area 24. The user 12 is shown with the panic device 20 in hand and utilizing the locator function of the system 10 to obtain assistance in finding his way. Also shown is another person 26 attempting to find his way using a map 28. This view illustrates the contrast between use of conventional methods for finding one's way and the use of a combination vehicle alarm and locator system 10 according to an aspect of the present invention. The combination vehicle alarm and locator system 10 receives GPS or other location signals, and wirelessly transmits location information as indicated by the arced lines labeled with the numeral 30.

Figure 3:
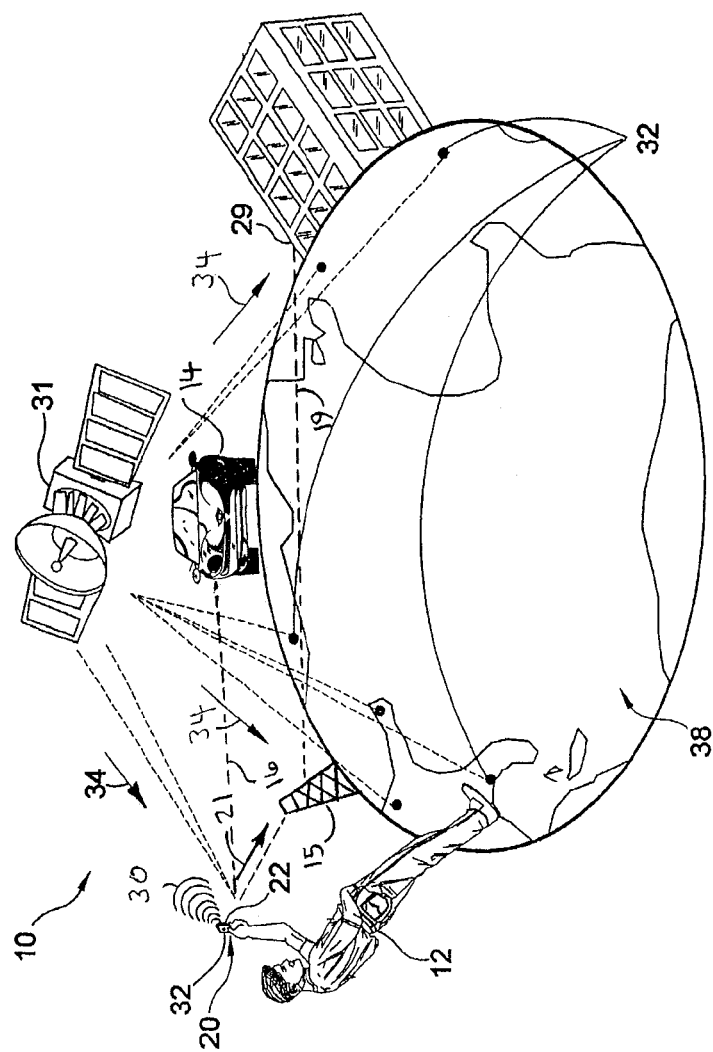
FIG. 3 is a pictorial view of an operation of an embodiment.

The location information, and likely user identification eventually get to an operations/ground dispatch station (referred to generically herein as a dispatch station), such as station 29 in FIG. 3. Upon activation of a second trigger 32 of the panic device 20, an alarm signal is generated and transmitted along with the location signal 30. This alarm signal alerts the dispatch station that the user 12 is in need of assistance. Upon receipt of the signal, the dispatch station can dispatch assistance to the user 12 at the identified location. In embodiments where the location signal 30 is constantly transmitted to the dispatch station, the dispatch station can locate the panic device 20 at any time irrespective of whether the second trigger 32 was activated.

FIG. 3 depicts some of the contemplated transmitting and receiving relations between a combination vehicle alarm and locator system 10 held by the user 12, an orbiting satellite 31 and a dispatch station 29. A plurality of dispatch stations 29 can advantageously be positioned throughout the world, as indicated by the plurality of black points.

Panic device 20 can transmit a location signal continuously, intermittently, or upon demand as discussed above. When a user 12 is lost or injured at a particular location and requires assistance, the user 12 activates a second trigger 32 on the panic device 20. Upon activation of the second trigger 32, an alarm signal is generated and transmitted along with a location signal 30 to the cellular tower 15, as indicated by the arrow labeled with the numeral 21. The cellular tower then transmits the information to one or more of the dispatch stations 29, by satellite, cable, telephone line, or in any other suitable manner. Relay 19 can be used to assist in locating the user 12.

Alternatively, the panic device 20 can transmit to the dispatch station 29 directly, or through some relay other than cellular tower 15, such as through vehicle 14 or through some other ground based relay. The transmission of the signal through the vehicle 14 is shown by the dotted line labeled with numeral 16.

Figure 4:
FIG. 4 is a perspective view of a lost child utilizing a locator feature of a combination vehicle alarm and locator system.
Figure 5:
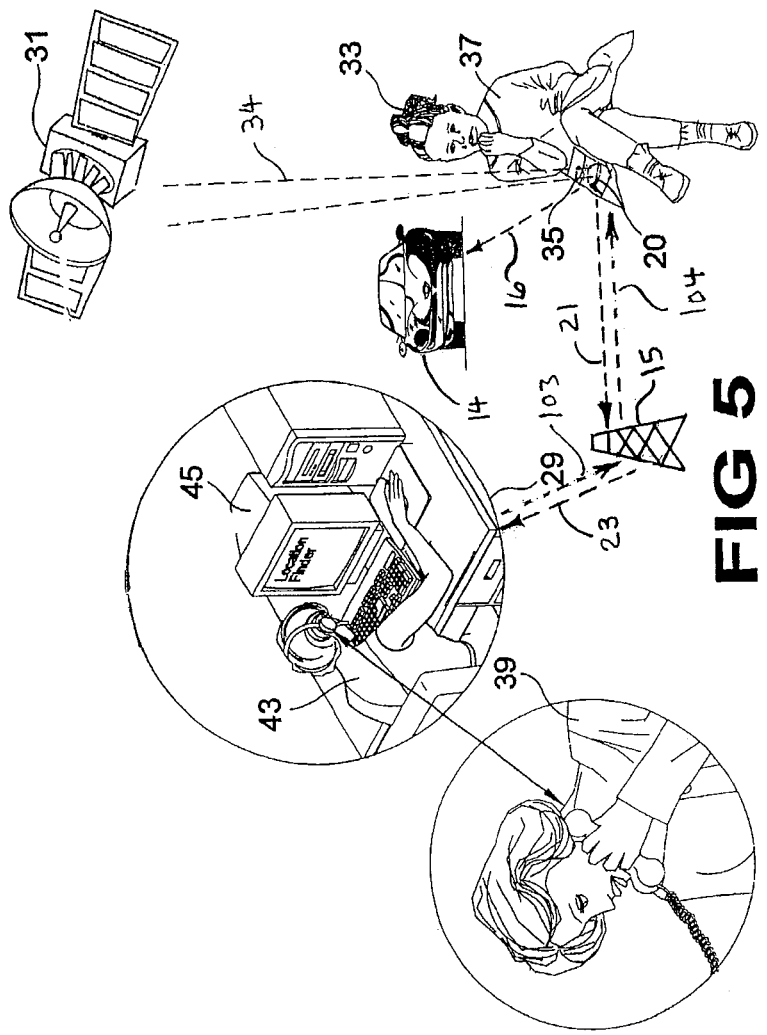
FIG. 5 is a pictorial view of an alternative operation of an embodiment.

In FIGS. 4 and 5, a lost child 33 is carrying the panic device 20 within a pocket 35 of an item of clothing 37. The panic device 20 provides location information to the dispatch station 29 either directly, or indirectly through some relay such as cellular tower 15, vehicle 14, or some other ground based relay. The transmission of the signal through the vehicle 14 is shown by the dotted lines 16 and 17. The location information can be derived from GPS data, cell phone triangulation or from any other suitable data. When the parent 39 contacts an operator 43 at the dispatch station 29, the operator 43 can advantageously utilize computer system 45 to help to identify the child and its location.

Figure 6:
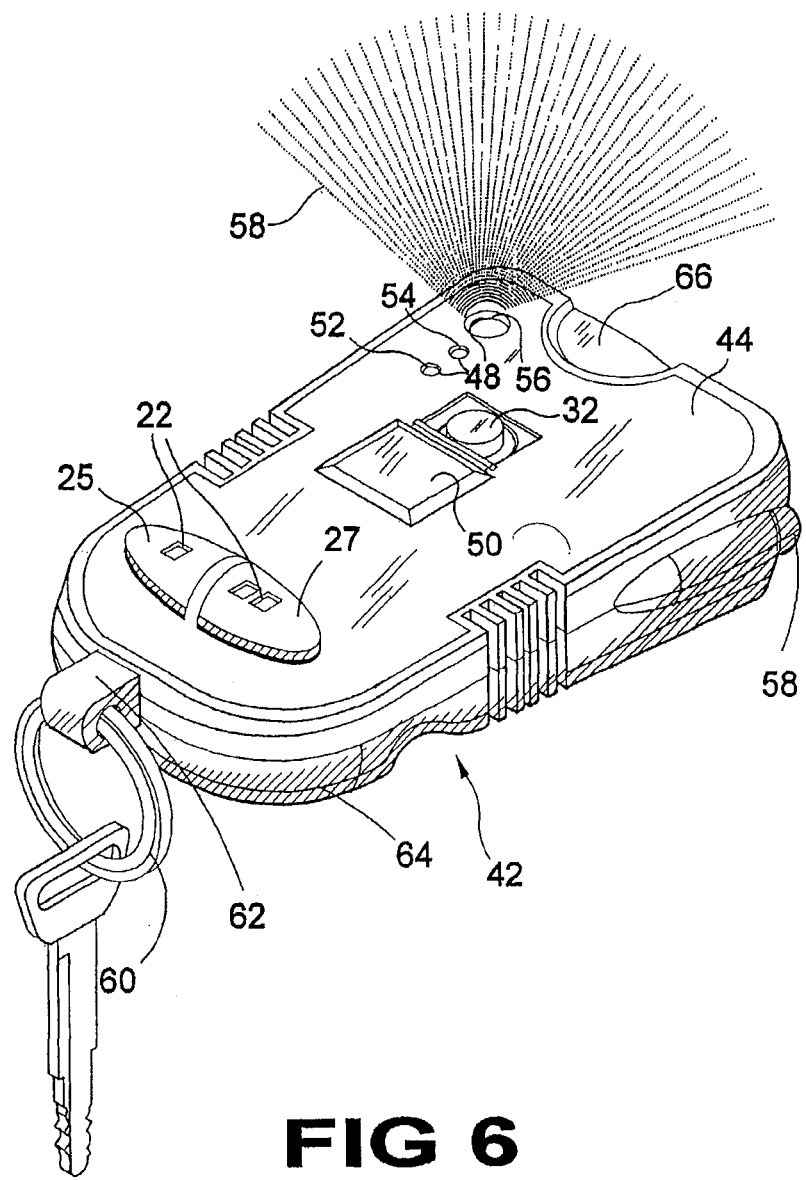
FIG. 6 is an enlarged top perspective view of a panic device of a combination vehicle alarm and locator system.

In FIG. 6, panic device 20 generally includes a housing 42 having a face side 44, second trigger 32 and a visual indicator 48. A cover 50 provides selective access to the second trigger 32 thereby decreasing the possibility of accidental activation of the locator function of the combination vehicle alarm and locator system 10. Activation of the second trigger 32 causes a signal to be generated and transmitted. Also extending through the face side 44 of the housing 42 is the first trigger 22, which includes a first button 25 for activating the vehicle alarm system and a second button 27 for deactivating the vehicle alarm system. The visual indicator 48 includes a first LED 52 for indicating that the battery is low, a second LED 54 for indicating that the device is operating properly and a third LED 56 for indicating that the second trigger 32 has been activated. Activation of the second trigger 32 causes the third LED 56 to illuminate as indicated by the dotted lines labeled with the numeral 68. The third LED 56 can also be made to flash and thereby provide a more visible indication that the second trigger 32 has been activated. Positioned on a side of the housing 42 is an antenna 58 through which the signal is transmitted to the dispatch station. A key ring 60 is connected to an end of the housing 42 by a key ring retainer 62. The key ring retainer 62 is releasably connected to the side of the housing 42 and is optionally removable from the panic device 20. A battery 64 is slidably positioned into a recess in the housing 42. Cover 66 on a side of the housing 42 covers infrared LEDs that are used to transmit a signal upon activation of the first trigger 22.

Figure 7:
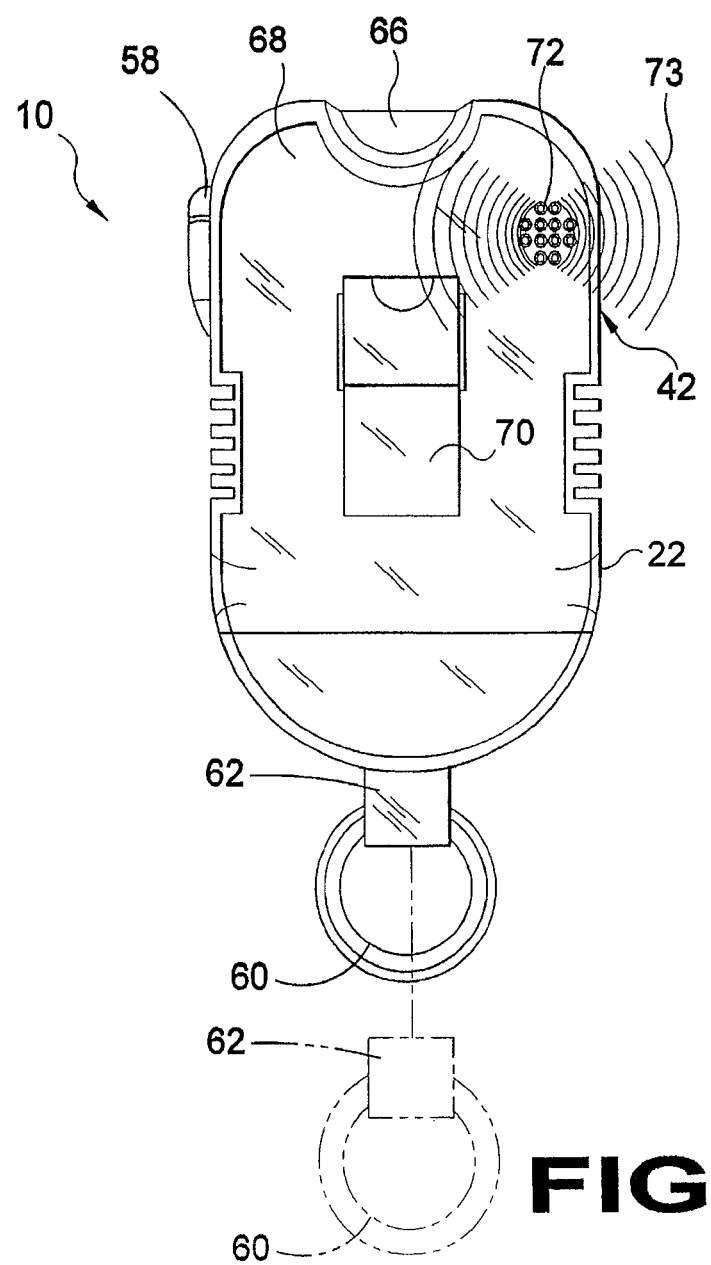
FIG. 7 is a back view of the panic device of the combination vehicle alarm and locator system.

FIG. 7 depicts a view of the back side of the combination vehicle alarm and locator system 10. As can be seen from this view, positioned on a back side of the panic device 20 is a clip 70 for attaching the panic device 20 to an article of clothing or accessory of the user. The clip 70 aids the user in retaining the panic device 20 in a non-obtrusive manner. Also positioned on the back side 68 is a speaker 72 through which audible signals 73 can be generated. The generation of audile signals can optionally occur upon activation of the first trigger 22 or the second trigger 32. The audible signals 73 are preferably in the form of a screeching sound for the purpose of frightening away attackers. Extending from a side of the housing is the removable key ring retainer 62 and key ring 60. The removable key ring retainer 62 is selectively removable from its position connected to the panic device 20. Extending from another side of the housing is the antenna 58.

Figure 8:
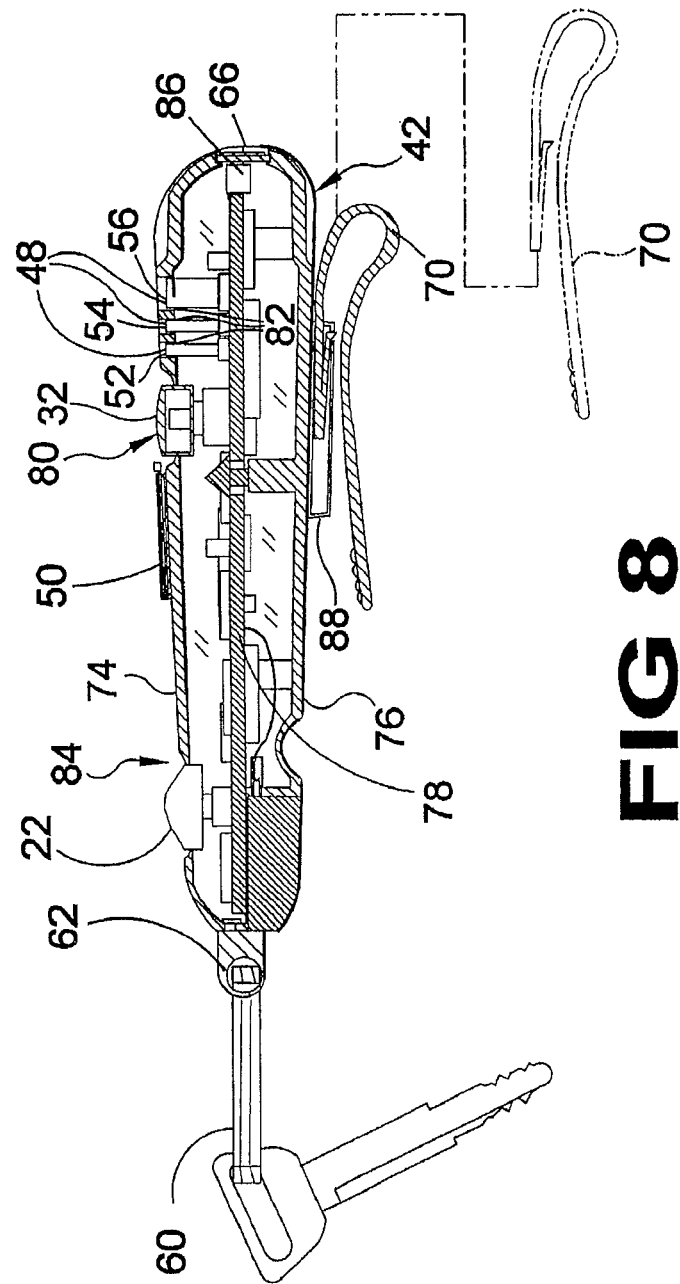
FIG. 8 is a side cross-sectional view of the panic device of the combination vehicle alarm and locator system.

FIG. 8 depicts a cross-sectional view of the panic device 20 of the combination vehicle alarm and locator system 10. As can be seen from this view, the housing 42 includes a top section 74 and a bottom section 76. Positioned between the top and bottom sections 74 and 76 is the internal circuitry 78 of the first trigger 22 for vehicle alarm system 10. The top section 74 includes a first recess 80 through which the second trigger 32 extends, second recesses 82 for receiving the visual indicators 48 and a third recess 84 for receiving the first trigger 22 for the vehicle alarm system. Selectively extending from a side of the housing between the top section 74 and the bottom section 76 is the key ring holder 62. The key ring 60 is connected to the key ring holder 62. On a side of the housing 42 opposite the key ring holder 62 is the cover 66. Positioned within the housing and aligned with the cover 66 is an infrared LED 86 for transmitting an infrared signal to a vehicle upon activation of the first trigger 22. Positioned on the bottom section 76 of the housing 42 is a clip retainer 88. The clip retainer 88 releasably secures the clip 70 to the bottom section 76. Positioned on the bottom side but not shown in this Figure is the speaker for generating the audible signal upon activation of the first trigger 22 or the second trigger 32.

Figure 9:
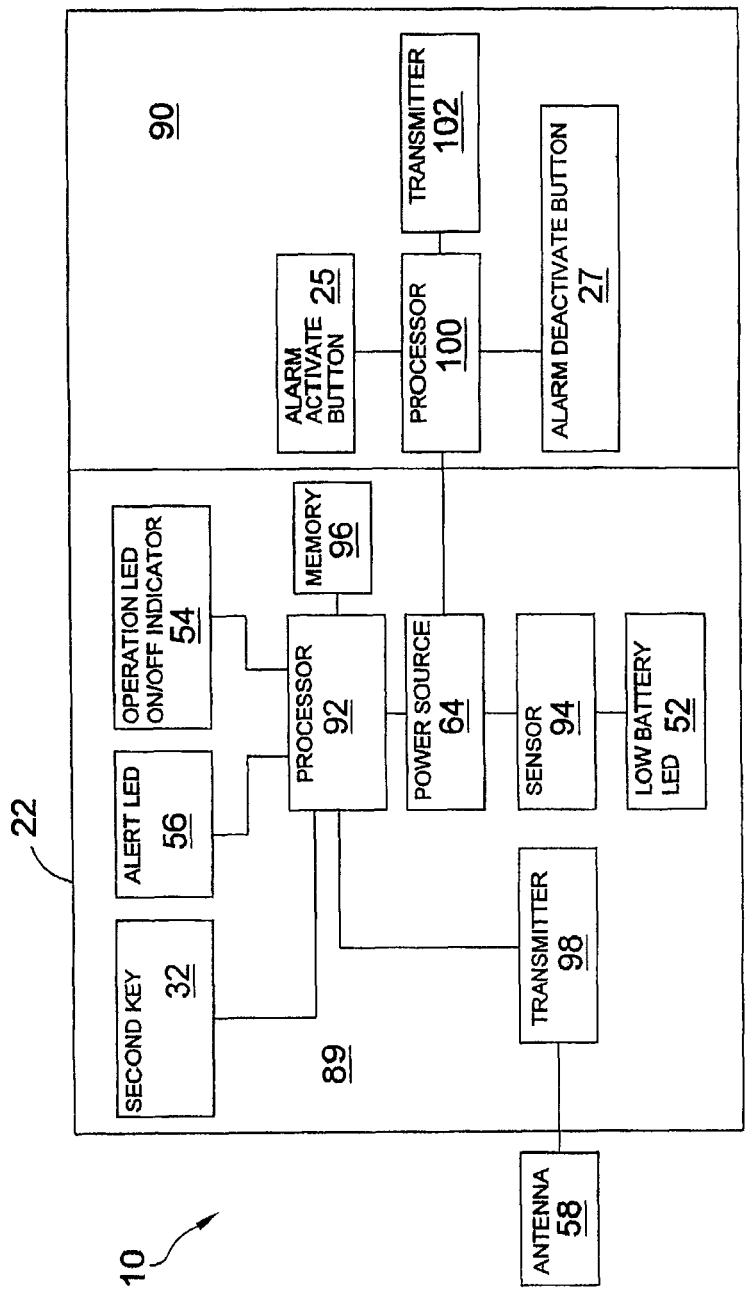
FIG. 9 is a block diagram illustrating the components of the combination vehicle alarm and locator system.

FIG. 9 shows a schematic diagram of the panic device 20. As can be seen from the Figure, the panic device includes a first location section 89 and a second vehicle alarm section 90. Within the first section 89 is a processor 92. The processor 92 is connected to the power source 64. The power source 64 is monitored by a sensor 94 which determines the power level of the power source 64. Upon determining that the power level is below a threshold value, the sensor 94 will activate the low power level LED 52 of the visual indicator 48. A memory 96 is connected to the processor 92 for storing identification information concerning the panic device 20 to be transmitted upon activation of the second trigger 32. The operation LED 54 and the alert LED 56 are also connected to the processor 92. The second trigger 32 is also connected to the processor 92. A transmitter 98 is connected between the processor 92 and the antenna 58 for transmitting a signal including the identification information concerning the panic device 20 upon activation of the second trigger 32.

The second section 90 is provided for activating and deactivating a vehicle alarm system. The second section 90 includes a processor 100 positioned therein. The processor 100 is connected to the power source 64. Alternatively, the second section 90 can include another power source. Connected to the processor 100 are the alarm activate button 25 and the alarm deactivate button 27. A transmitter 102 is also connected to the processor 100. The transmitter 102 is preferably an infrared LED for generating and transmitting an infrared signal to the vehicle alarm system.

Figure 10A:
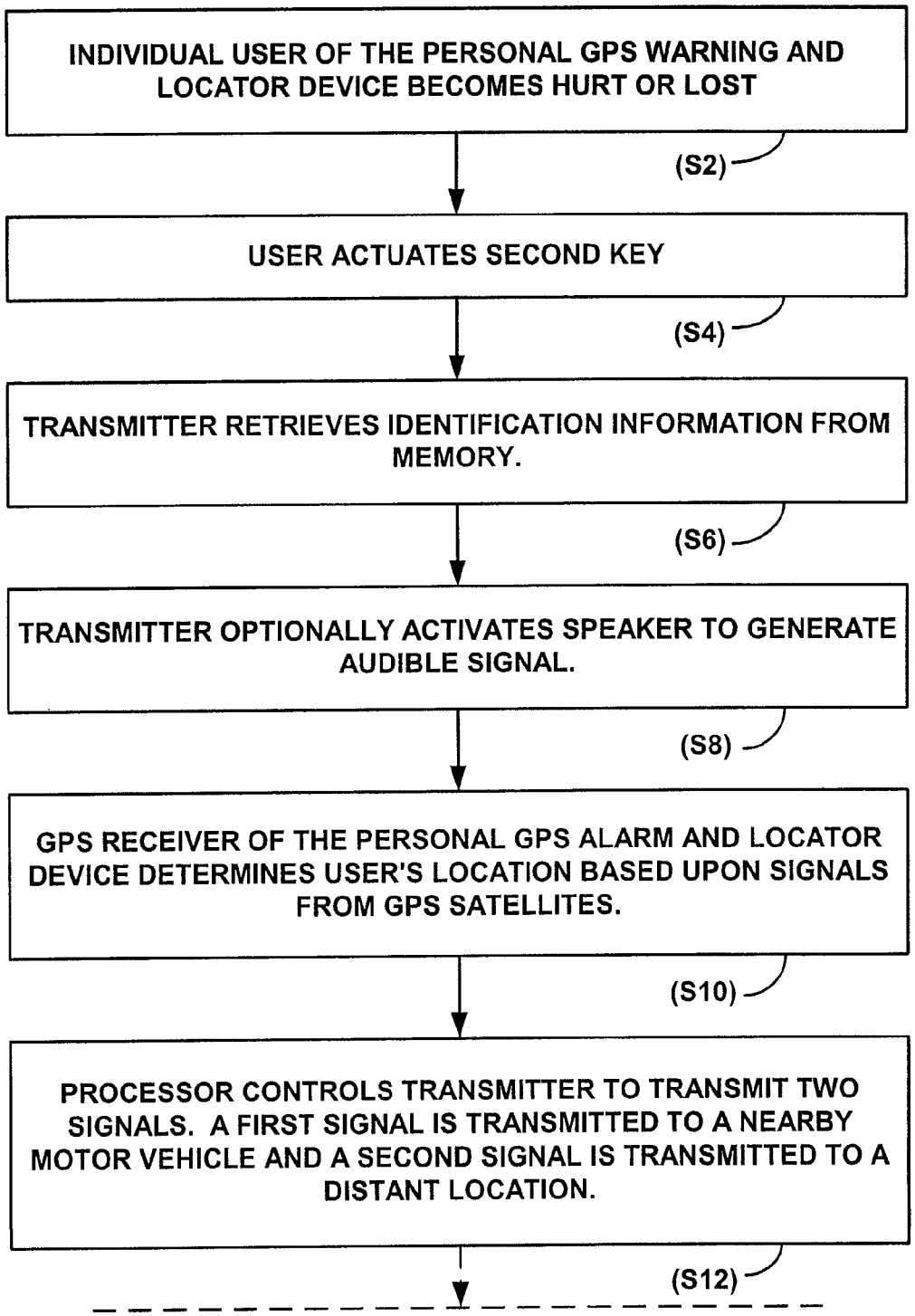
FIG. 10A is a first portion of a flow diagram describing a contemplated operation of a combination vehicle alarm and locator system.
Figure 10B:
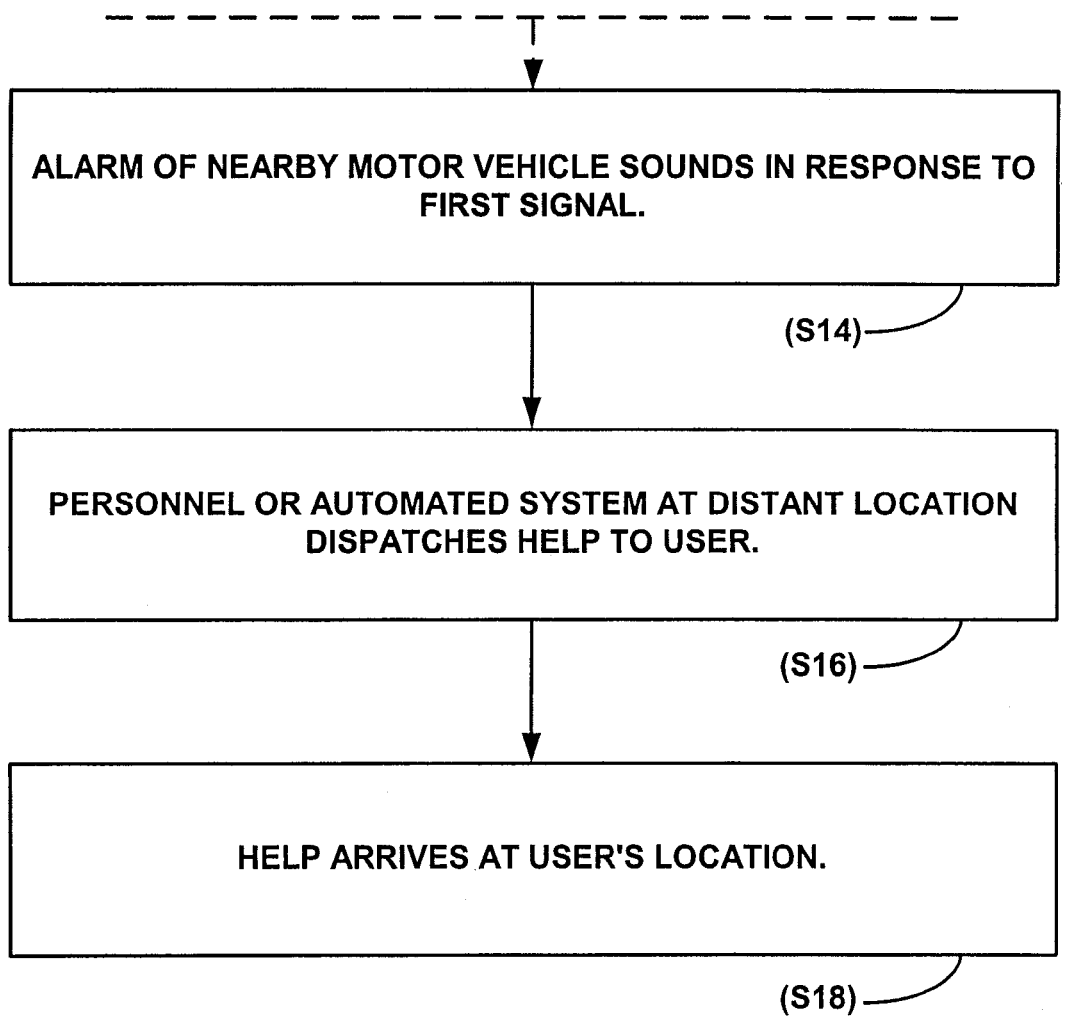
FIG. 10B is a continuation of the flow diagram of FIG. 10A.

FIG. 10A depicts a contemplated operation of a locator function. This function is beneficial when the user suffers an injury or is lost as discussed in step S2. Upon determining that the user is lost or injured, the user activates the second trigger 32 as stated in step S4. Upon activation of the second trigger 32, the transmitter 102 retrieves the identification information stored in memory 96 as described in step S6. The user can optionally activate the speaker to generate an audible signal which can be heard by persons in the area of the user as discussed in step S8. The user can also optionally activate the first trigger, thereby transmitting a signal to a nearby vehicle and causing the vehicle to sound an alarm as shown in step S10. The processor 92 activates the alarm circuitry to utilize a local device, such as a cell phone, for determining position information as shown in step S12. The processor 92 then activates the transmitter 102 to transmit a signal including the position and identification information and an alarm indication to a dispatch station through a cellular tower, vehicle, or other relay as stated in step S14. The dispatch station 29 receives the signal from the cellular tower or other relay and utilizes a computer system to determine the identity and location of the user as described in step S16. The dispatch station 29 can then contact authorities in a location near the user to send aid to the user as indicated in step S18.

To minimize on-board power requirements of panic device 20, panic device 20 can be adapted to communicate to the dispatch station 29 via a local relay such as vehicle 14, a radio relay station, a cell phone cell, a WAN access point or the like that is able to communicate with dispatch station 29.

A user is thus able to contact assistance when needed and also activate a vehicle alarm system using a single handheld panic device 20. The panic device 20 also can be used to retain keys thereon. The panic device 20 can also be clipped to an article of clothing worn by the user using the clip 70 on the back side and thus is unobtrusive to the user.

In FIG. 11 a panic device 200 generally has a housing 210 with an array of key retaining loops 212, a zipper closure 214, and a removable electronic card 220, which is shown as extending from a side pocket 216 of the housing 210. The card 220 includes a transmitter 222, a processor 223 and an activator 224, a microphone 225 and a speaker 226, other user button 227, and an optional GPS circuitry 228. The panic device can also be an electronic keyless responder or a proximity responder, such as a keyless fob.

In FIGS. 12A, 12B an alternative panic device 300 generally includes a housing 310 shaped as a key fob with a channel 312 to receive a key (shown in phantom). The device 300 also includes a transmitter 322, a processor 323 and an activator 324, other user buttons 327, and an optional GPS circuitry 328.

In FIG. 13 an alternative panic device 400 generally includes a housing 410 and a wire 412 sized and dimensioned to act as a key ring. The device 400 also includes transmitter 422, a processor 423 and an activator slider 424, other user buttons 427, and an optional GPS circuitry 428.

Figure 14:
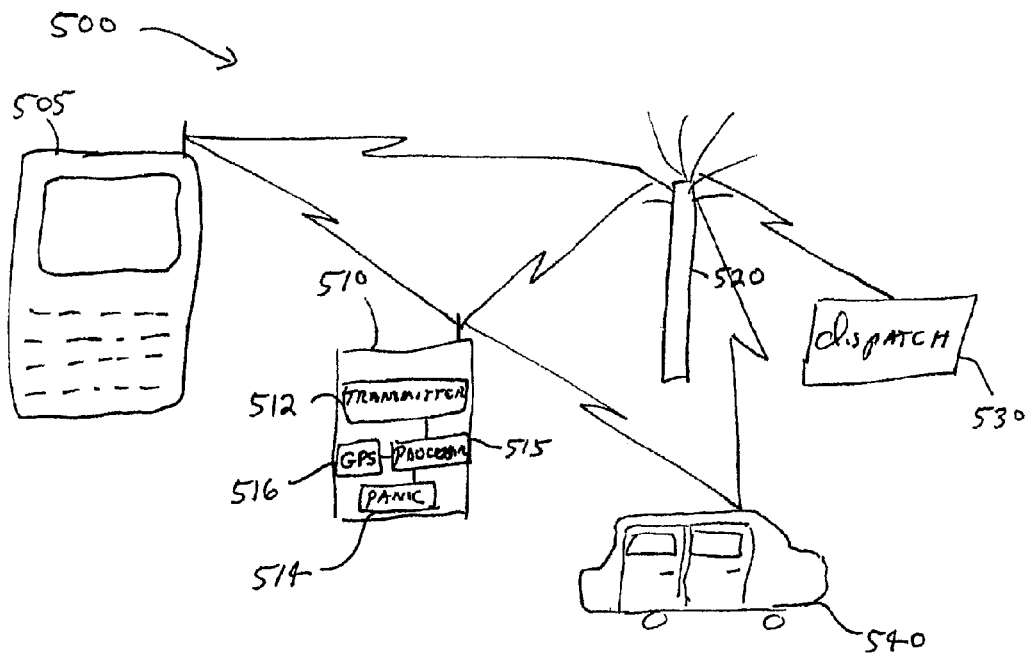
FIG. 14 is a schematic of a system in which a panic device contains an on-board GPS-aware circuit, and communicates with a distal dispatch station either directly through a cellular network or indirectly through a local relay (e.g., cell phone or automobile).

In FIG. 14 a system 500 generally includes a panic device 510 and one or more of: a portable electronic device 505 (e.g. a cell phone), a communication network 520 (euphemistically represented here as a cell tower), a dispatcher 530, and a local alarm-equipped apparatus 540 (euphemistically represented here as an automobile or truck). Panic device 510 should be interpreted generically, and especially to include any of devices 200, 300, or 400.

In this configuration the panic device 510 includes a transmitter 512, an activator 514, a processor 515, a GPS circuitry 516, and associated electronics and power supply (not shown). When the activator 514 is pressed or otherwise operated, the panic device 510 sends a signal to the local alarm-equipped apparatus 540 to sound an alarm. Another signal, which includes position information, is sent through the network 520 to the dispatcher 530, with or without the intervention of the portable electronic device 505.

Figure 15:
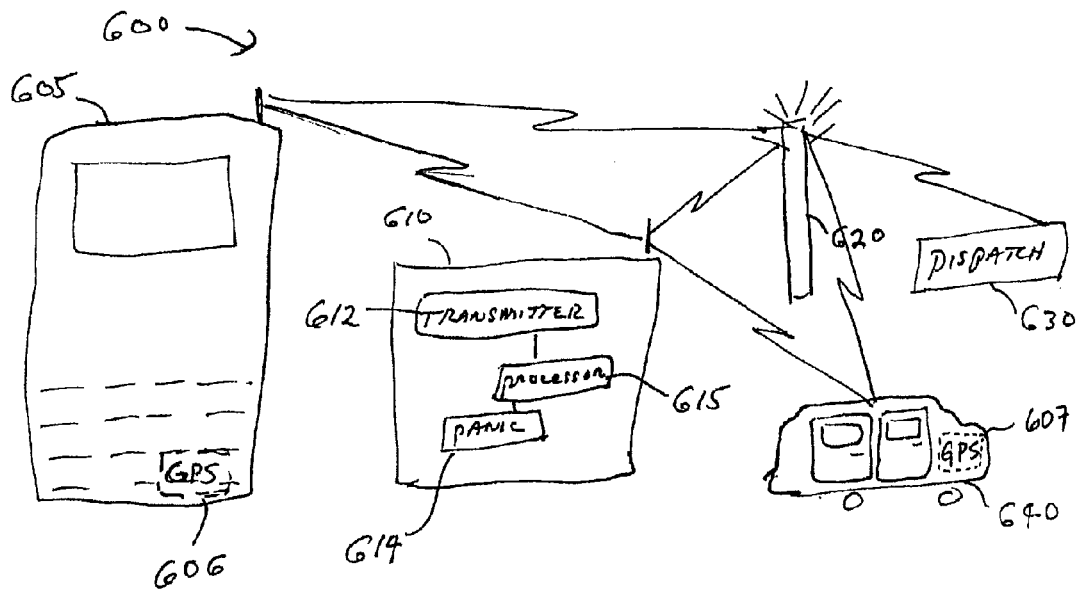
FIG. 15 is a schematic of an alternative system in which a panic device has no on-board GPS-aware circuit, and communicates with a distal dispatch station either directly through a cellular network or indirectly through a local relay (e.g., cell phone or automobile).

In FIG. 15 an alternative system 600 generally includes a panic device 610 and one or more of: a portable electronic device 605 (e.g. a cell phone) having a GPS circuitry 606, a communication network 620 (euphemistically represented here as a cell tower), a dispatcher 630, and a local alarm-equipped apparatus 640 (euphemistically represented here as an automobile or truck). Panic device 610 should also be interpreted generically, and especially including any of devices 200, 300, or 400.

In this configuration the panic device 610 includes a transmitter 612, an activator 614, and associated electronics and power supply (not shown). When the activator 614 is pressed or otherwise operated, the panic device 610 sends a signal to the local alarm-equipped apparatus 640 to sound an alarm, and another signal that includes position information, through the network 620 to the dispatcher 630, with or without the intervention of the portable electronic device 605. Position information is obtained from the GPS 606 in the portable electronic device 605 or from the GPS 607 in the apparatus 640.

The types of alarms that might be triggered are not limited in any way. As such, they can be of any type that can be sensed by hearing, sight, smell, touch, taste, and equilibrium, or can be a type that cannot be readily sensed such as a communication with another device. Moreover, alarms can be currently triggered, can be currently triggered only if current conditions are appropriate, can be time delayed, or can even be delayed and made contingent on the occurrence of one or more other events and/or conditions.

Contemplated devices can comprise inputs consisting only of those needed to trigger the local and remote alarms, or can comprise any additional inputs that don't interfere with the function of the device. Such inputs can be of any type including but not necessarily limited to buttons, touch pads, microphones, and motion detectors. In some instances a single input can be used to trigger both local and remote alarms. The same or additional inputs can also be used to deactivate any triggered alarms.

Determining the position of the device can be accomplished by the device itself, by a vehicle or other apparatus in proximity to the device or by an apparatus that is not in proximity to the device. If determined by the device, position information can be transmitted by the device as part of a remote alarm trigger. If determined by another apparatus in proximity to the device, such as an apparatus located in a vehicle, position information can be added to the signal passed on by the proximate apparatus. Position is preferably determined using a satellite based global positioning system, such as the GPS system popular today, possibly in conjunction with one or more ground based systems to improve accuracy. However, alternative embodiments can utilize another form of radio navigation system or some other type of positioning system.

Contemplated devices can comprise features other than those necessary to trigger alarms, sense local conditions, and/or communicate with other devices. Such features can include but are not limited to: one or more connectors for coupling a key to the device or coupling the device to another object such as a belt; one or more power connectors to allow power to be transmitted to and/or from the device; one or more data connectors to allow data to be transferred to and/or from the device; and one or more non-alarm related output devices such as a visual display.

EXAMPLE #1

A protection system comprising a plurality of trigger devices and at least one dispatch station, where each of the trigger devices is adapted to determine its current location, to accept inputs, to generate an alarm, and to transmit signals directly to the dispatch station. In this example, a person can carry the device and use it to trigger an alarm that would be emitted by the device itself, and/or to send a signal to the dispatch station. Since the device is able to determine its current location, the signal sent to the dispatch station includes position information.

EXAMPLE #2

In this case at least one of the trigger devices can send a signal to a local relay apparatus (typically located in a nearby vehicle) which in turn sends a signal to the dispatch station. It should be noted that the transmission between the relay apparatus and the dispatch station can itself involve multiple links and/or relays. As an example, a person could carry an alarm device that also functions as a key ring, use it to trigger a remote alarm by signaling the person's vehicle and having the vehicle relay the signal and/or its content to the dispatch station, possibly via a cellular telephone network.

EXAMPLE #3

In this case at least one of the trigger devices can send a signal to the dispatch station (either directly or indirectly), and can also send a signal to a local vehicle to activate an alarm in that vehicle.

EXAMPLE #4

In this case at least one of the trigger devices has no on-board GPS circuitry (or such circuitry is inoperable), and the location information sent to the dispatch station is derived from some local device such as a cell phone, PDA, or perhaps a local vehicle. Here, the signal transmitted to the dispatch station could come from the trigger device, but would more likely be generated and sent by the local device. The trigger device would therefore simply be instructing the local device to determine position, and send the location information to the dispatch station.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device configured to communicate with both (a) a local receiver associated with a motor vehicle, and (b) a distant receiver, comprising:
   a portable, hand-carried housing that houses a first input and a second input, a transmitter, and a speaker;
   wherein the first input is configured to trigger electronic, wireless transmission of a first alarm signal from outside the motor vehicle to the local receiver; and
   wherein the second input is capable of triggering electronic, wireless transmission of a second alarm signal to the distant receiver to assist the distant receiver in identifying a geographical position, and wherein the second alarm signal is a cellular signal.

2. The device of claim 1 wherein the first and second inputs are buttons.

3. The device of claim 1 wherein the first and second inputs are disposed on a touch pad.

4. The device of claim 1 wherein at least one of the first and second inputs comprises a microphone.

5. The device of claim 1 further comprising a GPS receiver that provides information regarding the geographical position.

6. The device of claim 1 wherein the device is configured to produce an alarm sound through the speaker when the first input is activated.

7. The device of claim 1 wherein the device is configured to provide cell phone signals that can be used to determine the position of the device by triangulation.

8. The device of claim 1 further comprising a cell phone facility that can be used to transmit the second alarm signal.

9. The device of claim 1 further comprising a WIFI phone facility that can be used to transmit the second alarm signal.

10. The device of claim 1 further comprising a physical key that extends from the housing, and that can be inserted into a lock of the motor vehicle.

11. The device of claim 1, wherein the device is a cell phone.

12. The device of claim 1, wherein the first signal is a different type of signal from the second signal.

13. The device of claim 1, wherein the first signal is a type of signal used for local transmission to an automobile, and the second signal is a type of signal used for distal transmission.

* * * * *